Oct. 3, 1967 R. A. HUFFORD 3,344,470
SIMULTANEOUSLY CLOSING BLOW MOLDING MACHINE
Filed July 16, 1963 3 Sheets-Sheet 1

INVENTOR.
Richard A. Hufford
BY
Wupper, Stadolph & Love
Attys

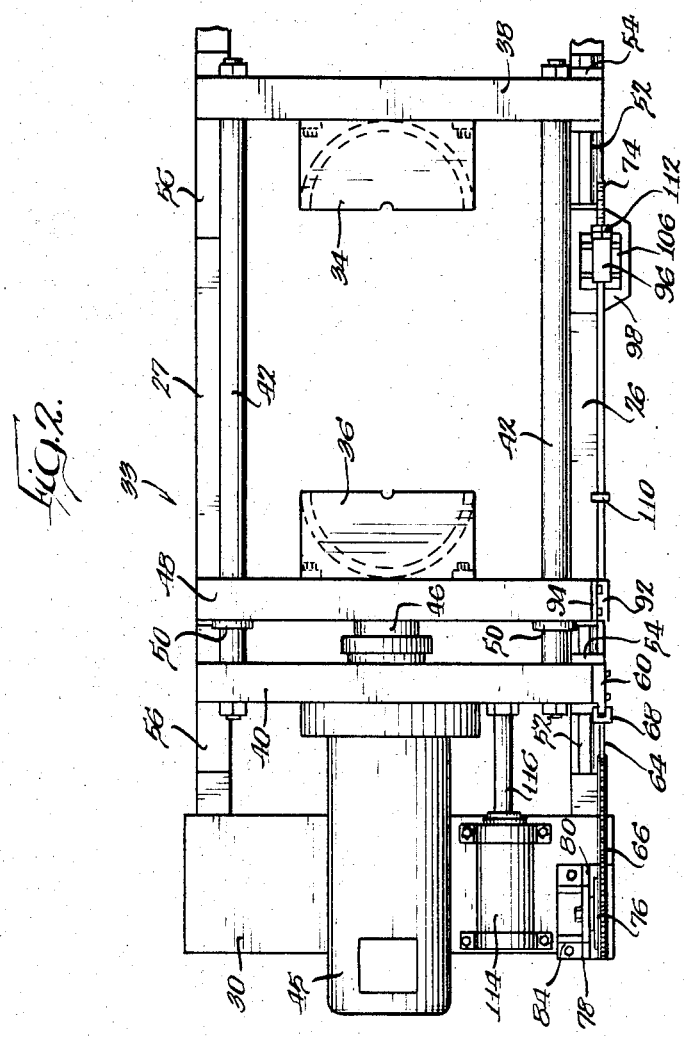

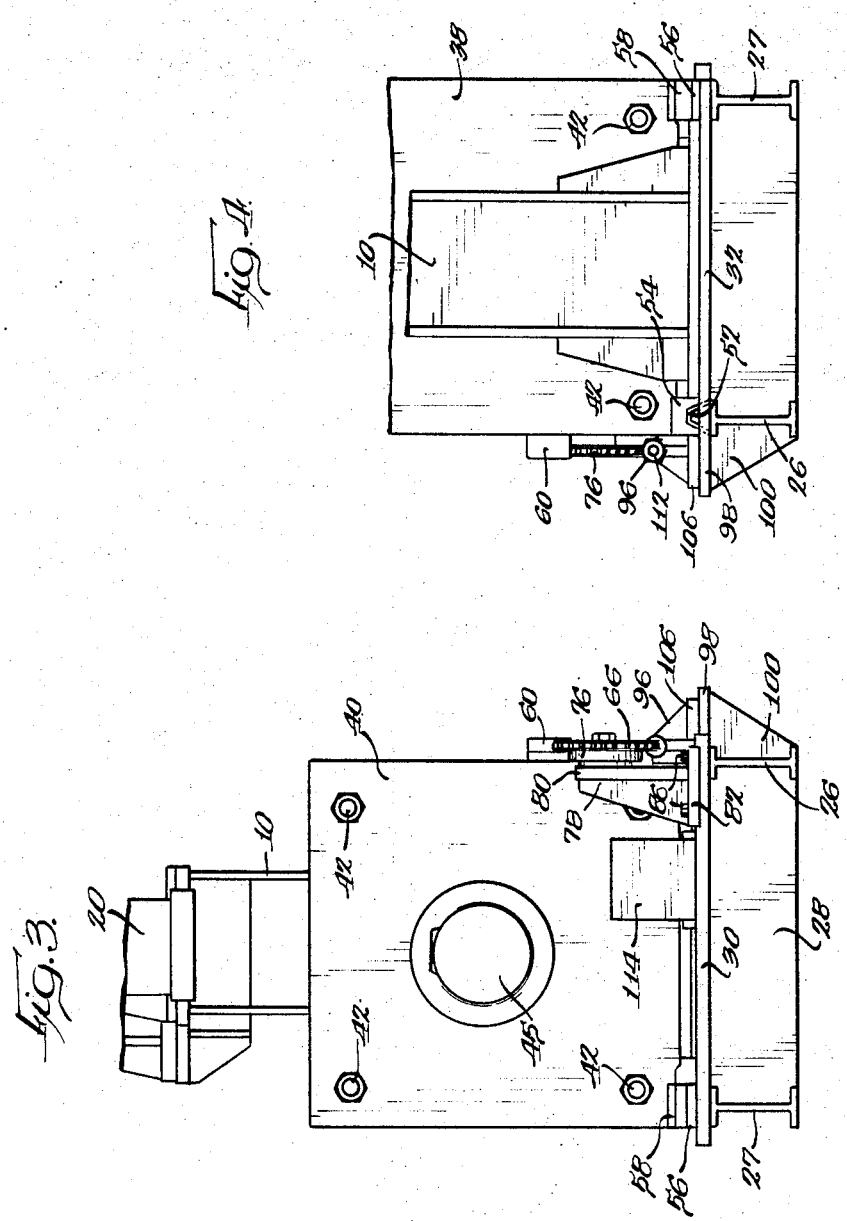

United States Patent Office 3,344,470
Patented Oct. 3, 1967

3,344,470
SIMULTANEOUSLY CLOSING BLOW MOLDING
MACHINE
Richard A. Hufford, Moline, Ill., assignor to Williams, White & Company, Moline, Ill., a corporation of Illinois
Filed July 16, 1963, Ser. No. 295,485
8 Claims. (Cl. 18—5)

My invention relates to a simultaneously closing blow molding machine.

In the practice of blow-molding particularly, it is usual to extrude a tube or parison of a plastic polymer downward between a pair of mold halves which, upon completion of the parison, are closed on it. Air thereafter is injected into the parison contained between the mold halves to blow it out against the interior of the mold. As long as the objects to be blown are small, a parison of relatively small diameter may be employed, and in such case it is possible to pinch off the parison or even sever it from its source by the unilateral movement of one mold half only.

When a tube of soft material is cut through or pinched off from one side against a stationary block or edge, the material on that side which the moving mold edge enters will be carried across to the opposite side of the tube. The material on the entering side therefore must define that part of the side wall of the tube and the top end (or bottom end) as well. Where the parison has a relatively small diameter, no great harm will result. The side encountered by the entering edge will collapse to a degree and since the distance of movement is small, the thinning will be negligible.

However, where parisons are of relatively great diameter, such as up to eighteen inches, for instance, the thinning of the parison wall encountered by the entering mold edge will be substantial. A wall thickness of one-quarter to three-eighths of an inch in such large diameter parisons is common. On the side remote from the entering mold half the wall will maintain its full thickness. On the side of the entering mold half, where the parison wall is carried over to meet the opposite wall, the wall portion must provide not only the wall itself but a top cylinder end, so to speak, as well, the entire material of which must be subtracted or stolen from the side of the entering mold edge. Thus, one side of the tube at its top and bottom ends will have full wall thickness, but the opposite side may have its wall thickness reduced by as much as half, for instance, at its top and and bottom ends. When blown, therefore, the top and bottom edges on one side of the object will be substantially thinner than on the other side.

A further unfortunate consequence of the non-symmetrical pinchoff is that at the very areas where the parison is usually called on to do the greatest amount of stretching, i.e., at the junction of side and end walls, the clamped parison has been stretched and thinned to the greatest degree.

A primary object of my invention may therefore be considered to be mechanism whereby the mold halves close equally on the parison so that each half penetrates no more than half way through the parison.

Another object of my invention lies in the provision of mechanism whereby the mold closure on the parison is not only symmetrical but is simultaneous as well. The mold halves will engage opposite sides of the parison simultaneously and move at equal rates of speed into it.

Still another object of my invention is the provision of mechanism whereby the movement of both mold halves into the parison is powered by a single power source.

Still another object of my invention resides in the provision of a lost motion arrangement with respect to one of the mold halves so that one mold half may be opened unilaterally a large distance away from the other mold half to permit withdrawal of blown articles and move unilaterally toward the other mold half during parison extrusion to a point spaced from the parison the same distance as the other mold half, whereafter the mold halves close together as described above.

Still another object of my invention lies in the provision of mold closing mechanism of the above described sort wherein adjustment to accommodate a wide variety of parison diameters and blown objects is simply and easily performed.

Yet another object is the provision of a blow molding machine incorporating a simultaneous closing device which is characterized by great simplicity, a minimum of sources of potential trouble or failure, positive assurance of desired action and a relatively low cost.

Other objects and advantages of my invention will be apparent from the following description and drawings of which:

FIG. 2 is a top plan view of the clamp assembly of the machine of FIG. 1;

FIG. 3 is an elevation of the left end of FIG. 2; and

FIG. 4 is a fragmentary elevation of the lower portion of the right end of FIG. 1.

Figure 1:
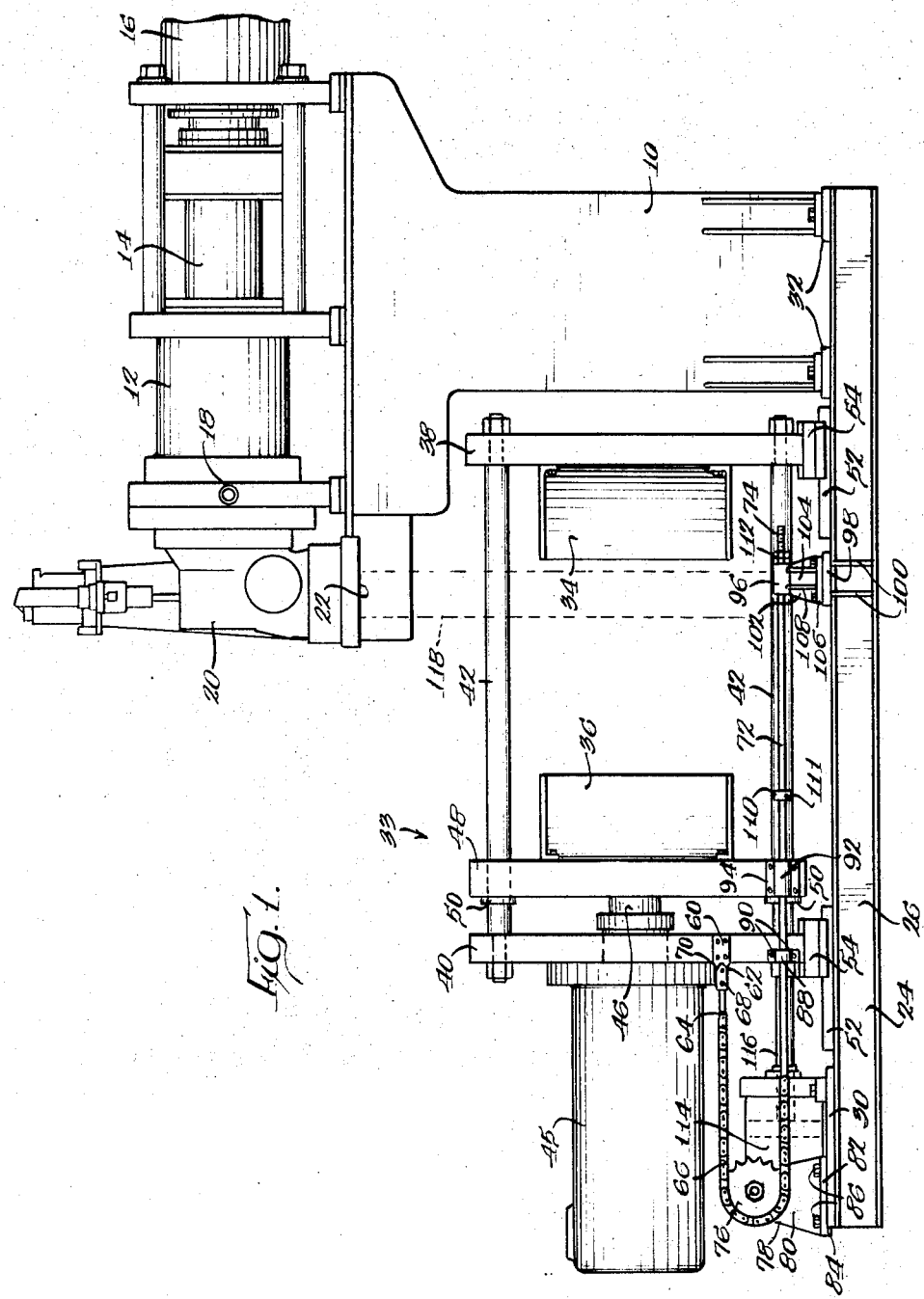
FIG. 1 is a side elevation of a blow molding machine incorporating an embodiment of the device of my invention.

The blow molding machine illustrated in FIG. 1 is generally of the type illustrated and described in the application of Eugene G. Engman, Ser. No. 49,099, filed Aug. 11, 1960, "Apparatus for Blowing Large Articles" and now U.S. Patent No. 3,110,928. It consists of a pedestal 10 on which is mounted an accumulator cylinder 12 having a hydraulic ram 14 reciprocable therein. The ram is powered by a hydraulic cylinder 16. An extruder (not shown) is connected to the front end of accumulator 12 as at 18 to feed plasticized polymer such as polyethylene or polypropylene into the accumulator. The accumulator is in open communication at its front end with a die head 20 having an annular orifice for the extrusion of the polymer in its lower face 22. The extruder feeds the polymer continuously into the accumulator but at a relatively slow rate in terms of the quantity required for the large objects for which my machine is intended. The inflowing polymer forces the accumulator ram 14 to the rear or to the right. When enough polymer has been accumulated in the accumulator (and the machine is otherwise ready for forming an object) pressure is applied to the cylinder 16 which advances the ram 14 to expel the polymer rapidly from the accumulator 12 through the die head and out and downwardly as a tubular parison from the face 22 of the die head. This structure is essentially similar to that described in the above identified application and further description is therefore believed unnecessary. The pedestal, of course, is to provide clearance for the mold below the die head, and the die head overhangs the pedestal a sufficient distance to accommodate comfortably a mold half between the downward projection of the die head and the pedestal. The above structure will be referred to hereafter collectively as the parison extruder.

As illustrated, the machine of my invention includes a bed 24 consisting of a pair of parallel longitudinal I-beams 26 and 27 appropriately cross braced by transverse beams 28 and a flat plate or table 30 secured across the tops of the beams at the ends remote from the parison extruder. The pedestal 10 of the parison extruder is substantially narrower than the bed and rests on transverse plates 32.

The clamp assembly 33 consisting of the stationary mold half 34 and the movable mold half 36 and associated structure, is mounted on the bed 24 but structurally is essentially independent of it and movable on it. The assembly incorporates a frame consisting of a pair of spaced parallel vertical plates 38 and 40 mounted transversely of the rails 26 and 27 and secured together in the spaced relation by horizontal, shouldered columns 42 at their corners. The inner plate 38 mounts the stationary mold half 34 against its outside surface. The outer plate 40 mounts a clamping cylinder 45 against its outside surface and is centrally apertured so that the rod 46 of the clamping cylinder extends inwardly therethrough. A third plate or a movable clamp 48, parallel to and between the plates 38 and 40, is mounted slidably on the columns 42 by means of appropriate bearings 50 in its corners, and the rod 46 of the clamp cylinder is secured to the outside of the clamp 48 to move it toward and away from the inner plate or stationary clamp 38. Clamp 48 mounts the other mold half 36 against its inner face.

The frame consisting of the plates 38 and 40 and columns 42 is mounted to be longitudinally slidable on the bed 24 by means of complementary sets of bearing blocks situated on the rails 26 and 27 and under the bottom corners of the plates 38 and 40. The bearing blocks 52 secured to rail 26 have upwardly convergent sides or an inverted V-shaped cross section. The associated blocks 54 mounted below the corners of the plates 38 and 40 overlying the blocks 52 have a complementally grooved undersurface. The bearing blocks 56 secured to rail 27 have flat horizontal top surfaces, and the complementary blocks 58 under the other bottom corners of the plates 38 and 40 have complementary flat bottom surfaces. The bearing blocks are, of course, faced with bearing metals and otherwise adapted to permit an easy sliding movement of the frame on the bed 24. The V-shaped bearings 52 confine the movement of the structure to longitudinal movement along the bed and inhibit any angular displacement of the structure. The flat bearings 56 and 58 accommodate expansions and contractions and minor errors in width.

A bracket plate 60 is secured to the front vertical edge of plate 40 (FIG. 1) which provides an outwardly extending ear 62. A link 64 is secured at one end to one end of a roller chain 66 and at the other end to a clevis 68 which is secured to the bracket ear 62 by a pin 70. The roller chain is secured at its other end to one end of a rod 72. Rod 72 is threaded as at 74 at its other end.

A sprocket wheel 76 is mounted to the table 30 outward of the frame and slightly off one edge thereof by a sprocket mount 78, the mount supporting the sprocket for rotation in a vertical plane with the top edge aligned with the bracket 60. The mount consists of a vertical plate 80 welded to a horizontal foot 82 and appropriately braced as at 84. Bolts 86 secure the foot to the table. The foot may have at its outward edge a downwardly extending lip 84 which engages over the outer edge of the table 30 and additionally secures the sprocket against unwanted displacement. The plate mounts a spindle 86 at its upper end to which the sprocket is secured.

The assembly including the rod 72, the chain 66 and the link 64 may be regarded as a tractive or a frame shift assembly. As will be appreciated from the drawings, the link extends outward from the outer plate 40. The chain continues the outer extension of the link for a substantial distance and then doubles back about the sprocket 76. The rod continues inward from the doubled back end of the chain. The whole assembly lies in a vertical plane immediately next to one of the side edges of the plates 38 and 40.

The rod 72 extends through an annular guide 88 secured to the side edge of plate 40 by feet 90. The rod is also contained in a sleeve 92 mounted by feet 94 to the side edge of the movable clamp 48.

Inward of the sleeve 92 a tubular stop 96 likewise encircles the rod. The stop is mounted to a small platform 98 secured to the rail 26 to extend outwardly from the side thereof and braced by gussets 100 extending to the web of the rail. The stop 96 is supported in elevated position in line with the guide 88 and the sleeve 92 by a base 102 consisting of a vertical plate 104, a base plate 106 welded to the bottom edge of the vertical plate through which the stop is bolted to the platform 98, and appropriate bracing 108.

The rod has a collar 110 mounted thereon between the sleeve 92 and the stop 96, and a nut and jam nut 112 on the threaded end of the rod inward of the stop 96. The collar is locked to the rod by a set screw 111.

To complete my assembly, a pneumatic cylinder 114 is secured to the table 30 with the rod 116 thereof extended and bearing against plate 40. The cylinder is under constant pneumatic pressure resiliently urging the frame inward or toward the parison extruder.

The operation of my machine will be readily understood from the foregoing description. A parison 118 indicated by dashed lines in FIG. 1 will be extruded from the lower face of the die head 22. At or before the time the parison is completed, closing pressure will be applied to the cylinder 44 to move the movable mold half 36 toward the stationary mold half 34. At the same time pneumatic pressure exists in the cylinder 114 to urge the clamp assembly 33 to its innermost position as determined by the nuts 112. This will be a position where, as illustrated, the forming parison will narrowly avoid the inner mold half. The distance from the stop 96 to the sprocket 76 is fixed. The pneumatic cylinder 114 is constantly forcing the clamp assembly 33 away from the sprocket. Therefore, any change in the length of the tractive assembly as determined by the location of the nuts 112 will be reflected entirely in the position of the clamp assembly 33 relative to the bed 24 or table 30.

As stated, pressure is applied to the clamp cylinder 44 to move the movable clamp 48 toward the inner plate 38. This movement occurs initially without any effect on the clamp assembly position or on the tractive assembly until the collar 110 is intercepted by the sleeve 92. The collar 110 is so positioned on the rod 72 that this interception occurs when the movable mold half 36 is spaced as far from the parison on one side as the stationary mold half 34 is on the other. Thereafter the still advancing clamp 48 will carry the collar 110 and so pull on the tractive assembly to take up the roller chain about the sprocket 76. This, of course, will have the effect of drawing the clamp assembly outward through the link 64 and the bracket 60 as the clamp 48 moves inward, so obtaining simultaneous and symmetrical closure of the mold halves on the parison.

To make clear the symmetrical and equal closing rates of the mold halves on the parison, let it be assumed that the clamp 48 is advanced eight inches after intercepting the collar 110. The eight inch movement will be relative to the clamp assembly 33 or to the outer plate 40. In this movement, the length of the tractive assembly relative to the frame or plate 40 (reading outward from the guide 88, the outer end of the rod 72, the chain 66 and the link 64) will be, in effect, shortened by eight inches. Since this shortening occurs in the doubled-back portion of the tractive assembly which passes around the sprocket and extends from plate 40 to plate 40, each leg of the bight will be shortened by four inches, and the clamp assembly will therefore be moved four inches closer to the fixed position of the sprocket 76 against the resilient force of the pneumatic cylinder 114. Since the movable mold half 36 has been advanced eight inches relative to the clamp assembly 33, but the clamp assembly has been retracted four inches, the movable mold half will make a net movement of four inches relative to the stationary die head. The stationary mold half being carried by the clamp assembly will be moved likewise four inches in the opposite direction. Thus, if the collar 110 is encountered by the sleeve 92 at a point where the mold halves are equidistant from the parison, it will be evident that the mold halves will close equally and simultaneously from each side on the parison and meet in the center thereof.

When the object is blown, the plate 48 will be retracted, under which conditions the reverse sequence of operations will occur. As the sleeve 92 receeds from the collar 110, the tractive assembly will tend to slacken about the sprocket 76 whereupon the pneumatic cylinder will move the clamp assembly 33 progressively inwardly until the nuts 112 encounter the stop 96 and the collar 110 can no longer follow the sleeve outwardly.

The adjustment of my device is easy. There is no limit imposed on the opening of the clamps other than the ends of the frame itself. There are only two variables to be considered, the diameter of the parison and the distance outside the parison from which simultaneous closure is to begin. The adjustment of the nuts 112 controls the distance of the stationary mold half 34 from the center of the die held. The positioning of the collar 110 determines the point in the travel of the movable mold half 36 at which simultaneous closure is to begin, and therefore the collar should be positioned to be intercepted by sleeve 92 when the movable mold half is as far from the center of the die head on one side as the stationary mold half 34 is on the other. There may be certain special objects to be blown which may require a certain asymmetry of closure, but it will be readily appreciated that the device of my invention may be adjusted to accommodate these situations, too.

The thing possibly above all to be noted in my invention is that it consists of the simplest sort of a mold closing press involving only the two end plates and the movable clamp. By making this substantially independent and movable relative to the die head, and by the provision of the simple and inexpensive moving means described, this most simple press serves the purpose of far more costly arrangements for obtaining simultaneous closure. The clamp structure is simple and rigid and as free from possible mechanical failure as only such simplicity can achieve. The simple clamp structure assumes all the loads of the blow molding process. The tractive assembly and the counteracting pneumatic cylinder serve only the purpose of moving the clamp assembly.

It will be evident from the foregoing description that I have described an embodiment only of my invention and that many alternatives in the practice thereof will undoubtedly suggest themselves. I therefore desire that my invention be regarded as being limited only as set forth in the following claims.

I claim:

1. A simultaneously closing blow molding machine comprising a clamp assembly including a frame having a first and second plate and columns tying said plates together in spaced parallel relation, said assembly including a clamp mounted between said plates for movement toward and away from said first plate, a cylinder and piston combination connected at one end to said clamp and at the other end to said second plate, a stationary parison extruder having a die head for the downward delivery of a plastic polymer parison between said first plate and said clamp, means mounting said assembly for movement in the line of said clamp movement, a rotatable member having a positionally fixed axis of rotation, means connecting said clamp to said member at a point spaced from said axis whereupon movement of said clamp toward said first plate rotates said member in one direction, and means connecting said assembly to said member at a point equally spaced from said axis whereupon said rotation of said member moves said assembly in the direction opposite to the movement of said clamp.

2. A simultaneously closing blow molding machine comprising a clamp assembly including a frame having a first and second plate and columns tying said plates together in spaced parallel relation, said assembly including a clamp mounted between said plates for movement toward and away from said first plate, a piston and cylinder combination connected at one end to said clamp and at the other end to said second plate, a stationary parison extruder having a die head for the downward delivery of a plastic polymer parison between said first plate and said clamp, means mounting said assembly for movement in the line of said clamp movement, a rotatable member having a fixed position beyond said second plate and having an axis of rotation, means connecting said clamp to said member at a point spaced from said axis whereupon movement of said clamp toward said first plate causes said member to rotate, and means connecting said assembly to said member at a point equally spaced from said axis and on the other side thereof from said first point to draw said assembly in the direction opposite to that of said clamp movement upon said rotation.

3. A simultaneously closing blow molding machine comprising a clamp assembly including a frame having a first and second plate and columns tying said plates together in spaced parallel relation, said assembly including a clamp mounted between said plates for movement toward and away from said first plate, means for moving said clamp mounted to said second plate, a stationary parison extruder having a die head for the downward delivery of a plastic polymer parison between said first plate and said clamp, means mounting said assembly for movement in the line of said clamp movement, a pulley having a fixed location beyond said second plate, and a tractive member having a flexible center portion entrained over said pulley and operatively connected at one end to said clamp and at the other end to said assembly.

4. The combination as set forth in claim 3 including additionally means resiliently urging said assembly away from said pulley.

5. The combination in claim 3 wherein said operative connection to said clamp comprises cooperating abutment members on said clamp and said tractive member adapted to meet in the movement of said clamp toward said first plate, when the edges of mold parts carried by the facing surfaces of said clamp and first plate are equally distant from the center of said die head.

6. A simultaneously closing blow molding machine comprising a clamp assembly including a frame having a first and second plate and columns tying said plates together in spaced parallel relation, said assembly including a clamp mounted between said plates for movement toward and away from said first plate, means for moving said clamp mounted to said second plate, and mold halves mounted to the facing surfaces of said clamp and said first plate having meeting edges, a stationary parison extruder having a die head for the downward delivery of a plastic polymer parison between said first plate and said clamp, means mounting said assembly for movement in the line of said clamp movement, a pulley having a stationary location beyond said second plate, a tractive member having a flexible center portion entrained over said pulley, connected at one end to said clamp assembly, said tractive member having a first abutment member nearer said pulley and a second abutment member farther from said pulley adjustably secured to the other end thereof, means resiliently biasing said assembly away from said pulley, an abutment stop fixed in position and engageable with said second abutment member for limiting the movement of said assembly by said biasing means, and engaging means on said clamp engageable with said first abutment member in the movement of said clamp toward said first plate when said edges of said mold halves are equally distant from the center of said die head.

7. A mold closing assembly for a blow molding apparatus comprising a frame, a pair of mold half plastens mounted on said frame at opposite sides of a stationary parison supporting means, means supporting said platens on said frame for guided movement toward and away from each other and said parison supporting means, power means for simultaneously driving said platens toward each other and said parison supporting means and simultaneously away from each other and said parison supporting means, and motion-equalizing means including a rotary element mounted in fixed relation on said frame, and a flexible member trained over the rotary element and having one end connected to one of said platens and the other end connected to the other of said platens.

8. A mold closing assembly for a blow molding apparatus comprising a clamp assembly including a pair of parallel platens, means guiding said platens for movement toward and away from each other, and a piston and cylinder combination connected on one side to one of said platens and on the other side to the other of said platens to move said platens toward and away from each other; a frame, means mounting said clamp assembly for movement on said frame in the line of platen movement, and motion equalizing means including a rotary element mounted in fixed relation on said frame, and a flexible member trained over the rotary element and having one end connected to one of said platens and the other end connected to the other of said platens.

References Cited

UNITED STATES PATENTS

| 2,975,473 | 3/1961 | Hagen et al. | 18—5 |
| 3,029,471 | 4/1962 | Adams et al. | 18—5 X |
| 3,063,092 | 11/1962 | Fischer | 18—5 |
| 3,068,511 | 12/1962 | Ahlbeck et al. | 18—5 |

FOREIGN PATENTS

| 18,384 | 11/1962 | Japan. |
| 1,147,301 | 6/1957 | France. |

WILBUR L. McBAY, *Primary Examiner.*

MICHAEL V. BRINDISI, *Examiner.*

J. SPENCER OVERHOLSER, *Assistant Examiner.*